(12) United States Patent
Li (10) Patent No.: US 12,260,521 B2
(45) Date of Patent: Mar. 25, 2025

(54) IMAGE PROCESSING METHOD AND APPARATUS, ELECTRONIC DEVICE, AND STORAGE MEDIUM

(71) Applicant: Tencent Technology (Shenzhen) Company Limited, Shenzhen (CN)

(72) Inventor: Zhicheng Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 664 days.

(21) Appl. No.: 17/573,491

(22) Filed: Jan. 11, 2022

(65) Prior Publication Data

US 2022/0138920 A1     May 5, 2022

Related U.S. Application Data

(63) Continuation of application No. PCT/CN2020/122203, filed on Oct. 20, 2020.

(30) Foreign Application Priority Data

Jan. 14, 2020   (CN) .......................... 202010038997.5

(51) Int. Cl.
*G06T 5/40*      (2006.01)
*G06F 18/22*     (2023.01)
(Continued)

(52) U.S. Cl.
CPC ................ *G06T 5/40* (2013.01); *G06F 18/22* (2023.01); *G06T 3/40* (2013.01); *G06T 7/90* (2017.01);
(Continued)

(58) Field of Classification Search
CPC .... G06T 5/40; G06T 3/40; G06T 7/90; G06T 2207/10024; G06F 18/22; G06V 10/50; G06V 10/56; H04N 1/40068
See application file for complete search history.

(56) References Cited

U.S. PATENT DOCUMENTS

2012/0148155 A1   6/2012   Lesellier
2014/0002737 A1*   1/2014   Damberg ................. G06T 5/40
                                                                        348/488
(Continued)

FOREIGN PATENT DOCUMENTS

CN          103778900 A      5/2014
CN          107492070 A     12/2017
(Continued)

OTHER PUBLICATIONS

Gonzalez, R.C.; Fittes, B.A. (Jun. 9-11, 1975). Gray-level transformations for interactive image enhancement (PDF). 2nd Conference on Remotely Manned Systems: Technology and Applications. Los Angeles, California. pp. 17-19. (Year: 1975).*
(Continued)

*Primary Examiner* — Ross Varndell
(74) *Attorney, Agent, or Firm* — Morgan, Lewis & Bockius LLP (57) ABSTRACT

An image processing method is performed by an electronic device, the method including: obtaining, according to a quantity of pixels whose color feature values fall within color feature intervals in an original image, a first histogram corresponding to the original image; obtaining, according to a quantity of pixels whose color feature values fall within the color feature intervals in an upsampled image of the original image, a second histogram corresponding to the upsampled image; respectively determining, according to the first histogram and the second histogram, target color feature intervals matching the color feature intervals in the second
(Continued)

histogram; and processing, according to the target color feature intervals matching the color feature intervals in the second histogram, the color feature values of the pixels falling within the color feature intervals in the upsampled image, to obtain a target image.

20 Claims, 6 Drawing Sheets

(51) Int. Cl.
*G06T 3/40* (2024.01)
*G06T 7/90* (2017.01)
*G06V 10/50* (2022.01)
*G06V 10/56* (2022.01)

(52) U.S. Cl.
CPC .............. *G06V 10/50* (2022.01); *G06V 10/56* (2022.01); *G06T 2207/10024* (2013.01)

(56) References Cited

U.S. PATENT DOCUMENTS

| | | | |
|---|---|---|---|
| 2015/0071533 A1* | 3/2015 | Krishnan | G06T 3/4053 382/167 |
| 2018/0061028 A1 | 3/2018 | Sunkavalli et al. | |
| 2018/0144509 A1 | 5/2018 | Risser | |
| 2022/0284543 A1* | 9/2022 | Jo | G06T 5/40 |

FOREIGN PATENT DOCUMENTS

| | | |
|---|---|---|
| CN | 108090887 A | 5/2018 |
| CN | 108900819 A | 11/2018 |
| CN | 108924525 A | 11/2018 |
| CN | 109003249 A | 12/2018 |
| CN | 109064434 A | 12/2018 |
| CN | 110049332 A | 7/2019 |
| CN | 107492070 B | 12/2019 |
| CN | 111260593 A | 6/2020 |
| JP | 2008191884 A | 8/2008 |
| JP | 2014508360 A | 4/2014 |
| JP | 2018518735 A | 7/2018 |
| JP | 2019016117 A | 1/2019 |
| WO | WO 2016188549 A1 | 12/2016 |

OTHER PUBLICATIONS

Morovic, Ján & Sun, Pei-Li, Accurate 3D image colour histogram transformation. Pattern Recognition Letters—PRL. 24. 1725-1735. 10.1016/S0167-8655(02)00328-8. (Year: 2003).*
Tencent Technology, Singaporean Office Action, SG Patent Application No. 11202202595V, Nov. 27, 2023, 6 pgs.
Tencent Technology, WO, PCT/CN2020/122203, Jan. 18, 2021, 5 pgs.
Tencent Technology, IPRP, PCT/CN2020/122203, Jul. 19, 2022, 6 pgs.
Tencent Technology, Extended European Search Report and Supplementary Search Report, EP20913353.7, Dec. 1, 2022, 8 pgs.
Tencent Technology, ISR, PCT/CN2020/122203, Jan. 18, 2021, 3 pgs.

* cited by examiner

Upsampled image

Target image

IMAGE PROCESSING METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2020/122203, entitled "IMAGE PROCESSING METHOD, APPARATUS, ELECTRONIC DEVICE, AND STORAGE MEDIUM" filed on Oct. 20, 2020, which claims priority to Chinese Patent Application No. 202010038997.5, filed with the State Intellectual Property Office of the People's Republic of China on Jan. 14, 2020, and entitled "IMAGE PROCESSING METHOD AND APPARATUS, ELECTRONIC DEVICE, AND STORAGE MEDIUM", all of which are incorporated herein by reference in their entirety.

FIELD OF THE TECHNOLOGY

This application relates to the field of computer technologies, and in particular, to an image processing method and apparatus, an electronic device, and a storage medium.

BACKGROUND OF THE DISCLOSURE

In the field of image processing, generally, a high-resolution image needs to be obtained or a resolution of a compressed image needs to be restored, that is, upsampling processing is performed on the image. An existing upsampling algorithm mainly includes an interpolation algorithm, a deep learning algorithm, or the like. The basic principle thereof is to calculate a color feature value of an inserted pixel according to a color feature value of an adjacent pixel. Through the algorithms, only color information of the inserted pixel is calculated according to color information of local adjacent pixels. As a result, obvious aliasing, color edge noise, and the like occur in an upsampled image, and quality and a display effect of the upsampled image are reduced.

SUMMARY

An image processing method is performed by an electronic device, the method including:
  obtaining, according to a quantity of pixels whose color feature values fall within color feature intervals in an original image, a first histogram corresponding to the original image;
  obtaining, according to a quantity of pixels whose color feature values fall within the color feature intervals in an upsampled image of the original image, a second histogram corresponding to the upsampled image;
  respectively determining, according to the first histogram and the second histogram, target color feature intervals matching the color feature intervals in the second histogram; and
  processing, according to the target color feature intervals matching the color feature intervals in the second histogram, the color feature values of the pixels falling within the color feature intervals in the upsampled image, to obtain a target image.

An image processing apparatus is provided, including:
  a first counting module, configured to obtain, according to a quantity of pixels whose color feature values fall within color feature intervals in an original image, a first histogram corresponding to the original image;
  a second counting module, configured to obtain, according to a quantity of pixels whose color feature values fall within the color feature intervals in an upsampled image of the original image, a second histogram corresponding to the upsampled image;
  a matching module, configured to respectively determine, according to the first histogram and the second histogram, target color feature intervals matching the color feature intervals in the second histogram; and
  a processing module, configured to process, according to the target color feature intervals matching the color feature intervals in the second histogram, the color feature values of the pixels falling within the color feature intervals in the upsampled image, to obtain a target image.

An electronic device is provided, including a memory and one or more processors, the memory storing computer-executable instructions, the computer-executable instructions, when executed by the processors, causing the one or more processors to perform operations of the image processing method.

One or more non-transitory computer-readable storage media storing computer-executable instructions are provided, the computer-executable instructions, when executed by one or more processors of an electronic device, causing the electronic device to perform operations of the image processing method.

BRIEF DESCRIPTION OF THE DRAWINGS

To describe the technical solutions in the embodiments of this application more clearly, the following briefly describes the accompanying drawings required in the embodiments of this application. Apparently, the accompanying drawings in the following description show merely some embodiments of this application, and a person of ordinary skill in the art may derive other drawings from these accompanying drawings without creative efforts.

DESCRIPTION OF EMBODIMENTS

To make the objectives, technical solutions, and advantages of embodiments of this application more comprehensible, the following clearly and completely describes the technical solutions in the embodiments of this application with reference to the accompanying drawings in the embodiments of this application.

To facilitate understanding, the following explains terms involved in the embodiments of this application.

Histogram, also referred to as a mass distribution profile, is a statistical report graph and represents data distribution by a series of longitudinal stripes or line segments with different heights. Generally, a data type is represented by using a horizontal axis, and a distribution is represented by using a longitudinal axis. In this application, color feature values are divided into a plurality of color feature intervals in advance, that is, a horizontal axis of a histogram is a color feature interval. A quantity of pixels whose color feature values fall within color feature intervals in one image is counted, to obtain a histogram representing a color feature distribution of the image.

RGB is a color standard in the industry, and is to obtain various colors by changing three color channels of red (R), green (G), and blue (B) and overlapping among them, where an RGB represents colors of RGB channels: red, green, and blue. This standard almost includes all colors perceptible to human vision, and is one of the most widely used color systems.

YUV is a color encoding method, and is commonly used in each video processing assembly. The YUV encodes a photo or a video taking human perception into account, allowing reduced bandwidth for a chrominance. YUV is a type of a color space for compiling true-color. Y'UV, YUV, YCbCr, YPbPr, and the like may be referred to as YUV, which overlap with each other. "Y" means luminance or luma, that is, a gray level value, and "U" and "V" mean chrominance or chroma, and are used for describing a color and a saturation of an image and used for specifying a color of a pixel.

CIELab: CIELab is a color system of the International Commission on Illumination (CIE), the meaning of based on CIELab is based on the color system, and the color system is basically used for determining numerical information of a color. A Lab mode is a color mode published by the CIE in 1976, and is a color mode theoretically including all colors visible to human eyes and determined by the CIE organization. The Lab mode makes up the shortage of two color modes of RGB and CMYK, and is an internal color mode used by Photoshop to convert from one color mode to another color mode. The Lab mode is also formed by three channels. A first channel is lightness, that is, "L". A color of an a channel is from red to dark green. A color of a b channel is from blue to yellow. In terms of expressing a color range, the Lab mode is the most comprehensive, followed by the RGB mode, and finally the CMYK mode. That is, the Lab mode defines the most colors and is independent of the light and device, and a processing speed is the same as that of the RGB mode and is faster than the CMYK mode several times.

Color feature interval is a plurality of interval ranges obtained by dividing a range of a color feature value corresponding to a color feature. In this application, a color feature may be data such as a grayscale, a brightness, and a color of a pixel representing a color feature of the pixel. For example, the color feature is a grayscale of a pixel, and a grayscale value ranges from 0 to 255. A grayscale value range of 0 to 255 may be divided into a plurality of interval ranges, and each interval range is used as a color feature interval. For example, 0 to 15 is a color feature interval, and 16 to 31 is a color feature interval. By analogy, 16 continuous color feature intervals b1 to b16 may be obtained in total. For ease of description, a grade of a color feature interval bi is recorded as i.

Subsampling: or referred to as downsampling, is to reduce a resolution of an image, that is, reduce a quantity of pixels of the image, so that the image meets a size of a display region or a thumbnail corresponding to the original image is generated.

Upsampling: or referred to as an image super resolution, is to improve a resolution of an image, that is, increase a quantity of pixels of the image, so that the image may be used in a high resolution application scenario or lost details of the original image are recovered. In an actual application, upsampling processing may be performed on an image through image interpolating or by using a deep learning algorithm. A common interpolation algorithm includes a nearest neighbor interpolation algorithm, a bilinear interpolation algorithm, a bicubic interpolation algorithm, a mean interpolation, a median interpolation algorithm, and the like.

Generally, when a high-resolution image needs to be obtained, an original image may be upsampled, to restore or reconstruct more details in the original image, thereby displaying the image in a display device with a higher resolution. Alternatively, when an image is processed by using a neural network, generally, an input image is first downsampled and then is inputted into the neural network to ensure that a resolution of the input image matches an input size of the neural network, and then an output image of the neural network is upsampled, to restore a resolution of the output image to an original resolution. At least one downsampling network layer may alternatively be disposed in the neural network, and a resolution of an image is reduced during processing to improve processing efficiency. At least one upsampling network layer is disposed, to restore a resolution of a downsampled image.

Any quantity of elements in the accompanying drawings is merely an example but not a limitation, and any term is merely used for distinguishing, and does not have any limitation meaning.

In a specific practice process, a related upsampling algorithm mainly includes an image interpolation algorithm, a deep learning algorithm, or the like. The basic principle of any interpolation algorithm is to calculate a color feature value of an inserted pixel according to a color feature value of an adjacent pixel. The basic principle of the deep learning algorithm is also to learn a relationship between adjacent pixels by using a neural network to obtain an inserted pixel. Color information of the inserted pixel is calculated through the algorithms based on only color information of local adjacent pixels. As a result, an upsampled image has obvious aliasing, color edge noise, and the like, and adjacent pixel sets without one or two directions of up, down, left, or right exist at the edge of the image. Filling is performed by using available adjacent pixels when the current algorithms are used, and a pixel effect at the edge of the image greatly differs from an expected effect, resulting in reduction of quality and a display effect of the upsampled image.

In view of this, this application provides an image processing method, including: obtaining, according to a quantity of pixels whose color feature values fall within color feature intervals in an original image, a first histogram corresponding to the original image; obtaining, according to a quantity of pixels whose color feature values fall within the color feature intervals in an upsampled image of the original image, a second histogram corresponding to the upsampled image; respectively determining, according to the first histogram and the second histogram, target color feature intervals matching the color feature intervals in the second histogram; and processing, according to the target color feature intervals matching the color feature intervals, the color feature values of the pixels falling within the color feature intervals in the upsampled image, to obtain a target image. According to the image processing method, a first histogram is a histogram representing a color feature distribution in an original image, and a second histogram is a histogram representing a color feature distribution in an upsampled image. Target color feature intervals matching color feature intervals in the second histogram are determined according to the color feature distributions shown in the first histogram and the second histogram, and then color feature values of pixels in the upsampled image are adjusted one by one according to the matched target color feature intervals, to obtain a target image corresponding to the upsampled image, so that a color feature distribution in the target image corresponding to the upsampled image is consistent with the color feature distribution in the original image as much as possible. By using the method, aliasing, color edge noise, and the like in the upsampled image can be weakened obviously, quality and a display effect of the upsampled image are improved, image details are restored better, and the processing manner is simple and efficient. The method is particularly applicable to an application scenario with a high processing efficiency requirement, for example, video real-time transmission.

After a design idea of the embodiments of this application is described, the following briefly describes application scenarios to which the technical solutions in this embodiment of this application are applicable. The application scenarios described below are merely used for describing rather than limiting the embodiments of this application. During specific implementation, the technical solutions provided in the embodiments of this application are flexibly applicable according to an actual requirement.

Figure 1A:
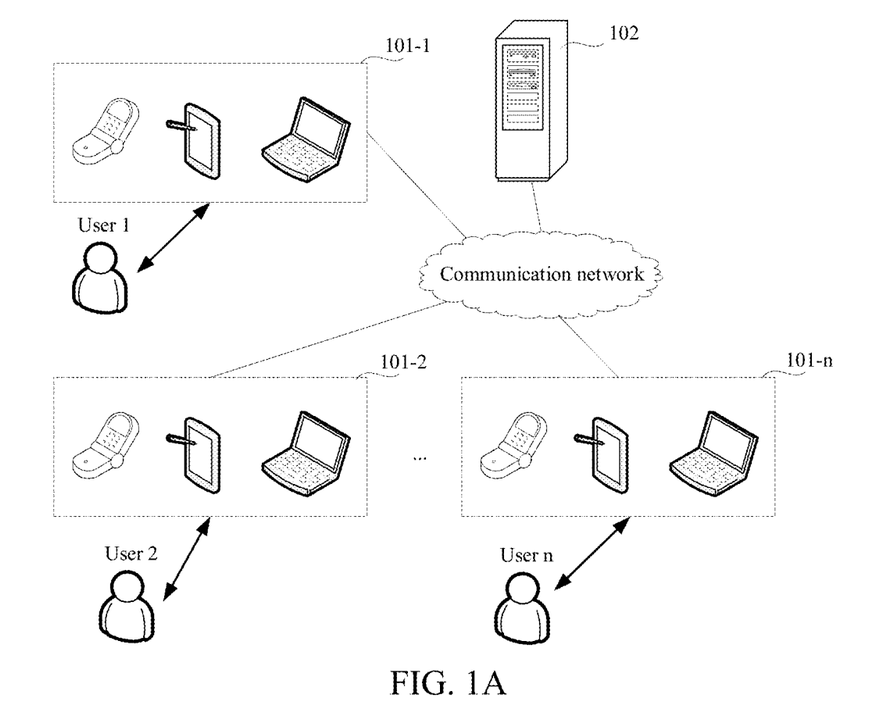
FIG. 1A is a schematic diagram of an application scenario of an image processing method according to an embodiment of this application.

FIG. 1A is a schematic diagram of an application scenario of an image processing method according to an embodiment of this application. The application scenario includes a plurality of terminal devices, including a terminal device 101-1, a terminal device 101-2, . . . , and a terminal device 101-n, and a back-end server 102. The terminal devices are connected to the back-end server 102 through a wireless or wired network. The terminal devices include, but are not limited to, a desktop computer, a smartphone, a mobile computer, a tablet computer, a media player, a smart wearable device, a television, a surveillance camera, and the like. The back-end server may be one server, a server cluster formed by multiple servers, or a cloud computing center. The terminal device may upload an image or a video to the back-end server 102, or obtain an image or a video from the back-end server 102. During image or video acquisition or transmission, to effectively use a limited bandwidth, a low-resolution image or video may be transmitted, and then the low-resolution image or video is converted into a high-resolution image or video at a receiving end. The terminal device or the back-end server 102 may perform enhancement processing on an upsampled image with reference to the image processing method provided in this application when performing upsampling processing on the image or the video. A specific application scenario is not limited to video live streaming, video transmission, image transmission, and the like.

Certainly, an image or a video may alternatively be transmitted between two terminal devices directly. For example, the surveillance camera performs downsampling processing on an acquired video and then transmits the downsampled video to a surveillance display, and the surveillance display performs upsampling processing on the downsampled video, to obtain a high-resolution video for display.

Figure 1B:
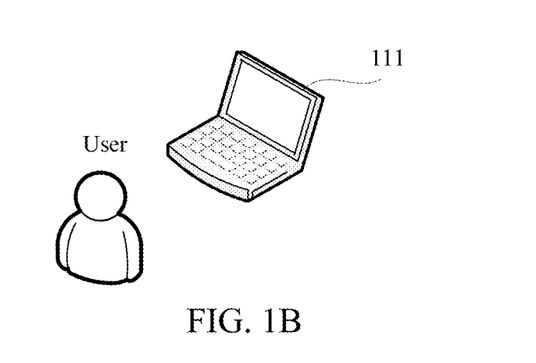
FIG. 1B is a schematic diagram of an application scenario of an image processing method according to another embodiment of this application.

FIG. 1B is a schematic diagram of an application scenario of an image processing method according to an embodiment of this application. An image processing application is installed in a terminal device 111, and a software function module corresponding to the image processing method provided in this application is implanted in the image processing application. When obtaining a high-resolution image (that is, an upsampled image) corresponding to an original image by using the image processing application in the terminal device 111, a user may process the upsampled image by using the image processing method provided in this application and based on a histogram of the original image and a histogram of the upsampled image, to obtain a high-resolution image. For example, a compressed image or video, a polluted and damaged picture, or a surveillance video or picture with a relatively low resolution may be restored and reconstructed through the image processing application. The terminal device 111 includes, but is not limited to, devices such as a desktop computer, a mobile computer, a tablet computer, and a smartphone that can run the image processing application.

The image processing method provided in this application may be further implanted into image viewing software or image editing software. When the user views an image through the image viewing software or the image editing software, and if the user needs to focus on some details of the image, the image can be scaled and transformed. In this case, the image viewing software or the image editing software may process an upsampled image based on a histogram of an original image and a histogram of the upsampled image, to obtain a high-resolution image.

The image processing method provided in this application may be widely used in processing of special images such as radar images, satellite remote sensing images, astronomical observation images, geological exploration data images, biomedical slices, and microscopic images, and daily person scenery images and videos.

Figure 1C:
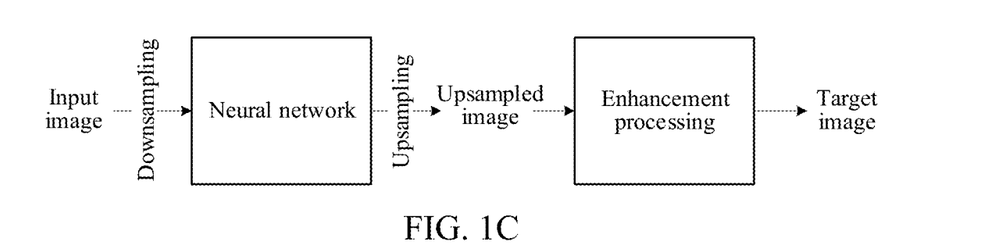
FIG. 1C is a schematic diagram in which an image processing method is applicable to a neural network according to an embodiment of this application.
Figure 1D:
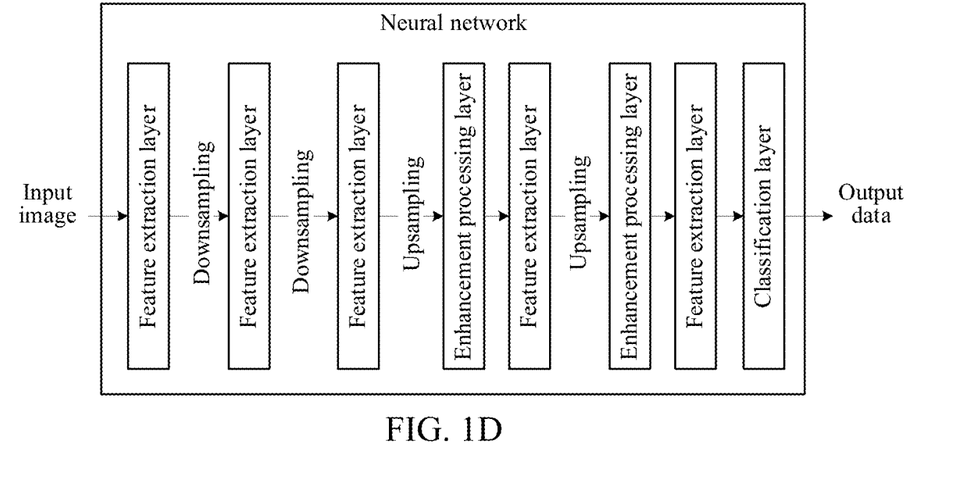
FIG. 1D is a schematic diagram in which an image processing method is applicable to a neural network according to another embodiment of this application.

The image processing method provided in this application is further applicable to a neural network. For example, referring to FIG. 1C, when an image is processed by using a neural network, generally, an input image is first downsampled and then is inputted into the neural network to ensure that a resolution of the input image matches an input size of the neural network, and then an output image of the neural network is upsampled, to restore a resolution of the output image to the resolution of the input image. Enhancement processing may be performed on the upsampled image by using the image processing method provided in this application, to obtain a target image, to improve quality and a display effect of the target image. In another example, referring to FIG. 1D, the neural network may further include at least one time of downsampling processing, a resolution of an image is reduced during processing to improve processing efficiency, and the resolution of the image is restored through at least one time of upsampling processing. In this case, an enhancement processing layer may be added after the upsampling network layer, to process the upsampled image by using the image processing method provided in this application, to improve quality of the upsampled image, and then a processed image is inputted into a next network layer for processing.

Certainly, the method provided in the embodiments of this application is not limited to the application scenarios, and is further applicable to other possible application scenarios. This is not limited in the embodiments of this application. The functions that can be implemented by the devices in the application scenarios are to be described together in the subsequent method embodiments, and details are not described herein again.

To further describe the technical solutions provided in the embodiments of this application, the technical solutions are described in detail below with reference to the accompanying drawings and specific embodiments. Although the embodiments of this application provide method operational steps shown in the following embodiments or accompanying drawings, more or fewer operational steps may be included in the methods based on conventional efforts or without creative efforts. In the steps in which no necessary causal relationship logically exists, the execution order of the steps is not limited to the execution orders provided in the embodiments of this application.

The technical solution provided in this embodiment of this application is described with reference to the application scenarios below.

Figure 2:
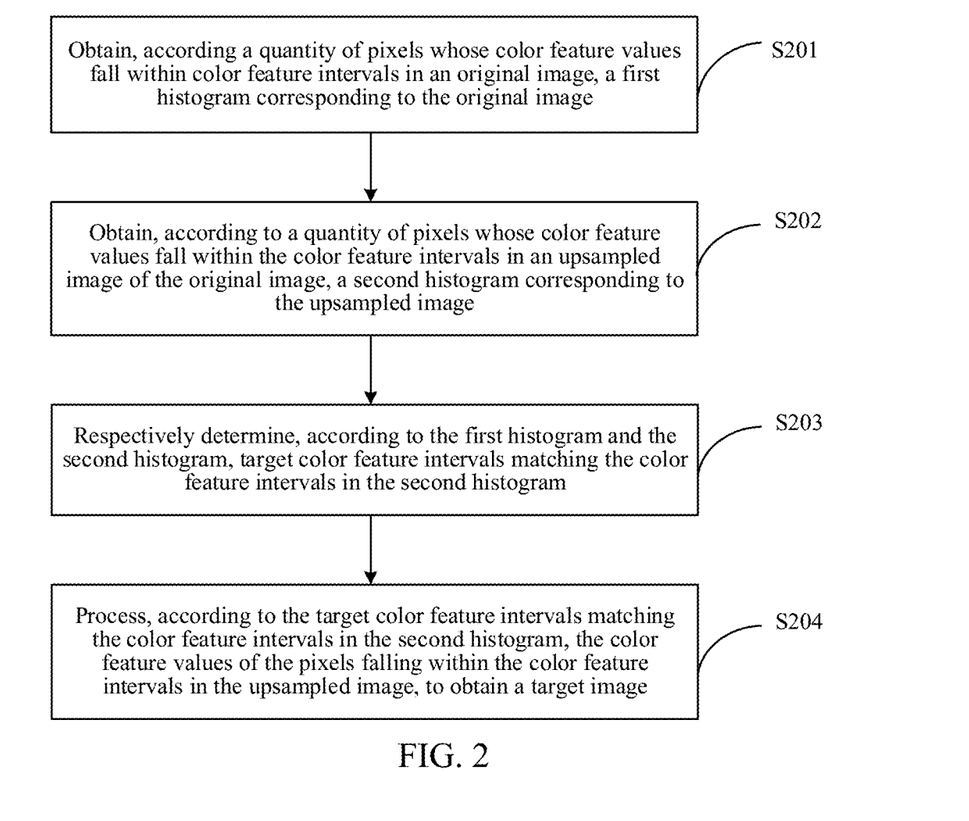
FIG. 2 is a schematic flowchart of an image processing method according to an embodiment of this application.

FIG. 2 shows an image processing method according to an embodiment of this application. The method is applicable to the terminal device or the back-end server in the application scenario and specifically includes the following steps.

S201. Obtain, according to a quantity of pixels whose color feature values fall within color feature intervals in an original image, a first histogram corresponding to the original image.

In this embodiment of this application, an original image may be an image before upsampling processing, and the original image may be an individual image or may be a frame of image in a video.

In this embodiment of this application, a color feature is a feature representing a color characteristic of a pixel, for example, the color feature may be a grayscale, a brightness, a color, or the like of a pixel. Correspondingly, a color feature value includes at least one of the following: a grayscale value of a pixel, a brightness value of the pixel, a color value of the pixel, or the like.

During specific implementation, the color value may be determined according to a color system used for an image. For example, when the image is a grayscale image, a color feature of each pixel in the image may include a grayscale value. In this case, a histogram corresponding to the grayscale value may be obtained for the image. When a color of the image is described through RGB, each pixel in the image has three color features of R (red), G (green), and B (blue), and the three color features may be respectively counted, that is, three histograms respectively corresponding to the three color features of R (red), G (green), and B (blue) may be obtained for the image. For a color image, a grayscale value of each pixel in the color image may be obtained through the following formula:

gray=$R \times 0.299 + G \times 0.587 + B \times 0.114$.

Figure 3:
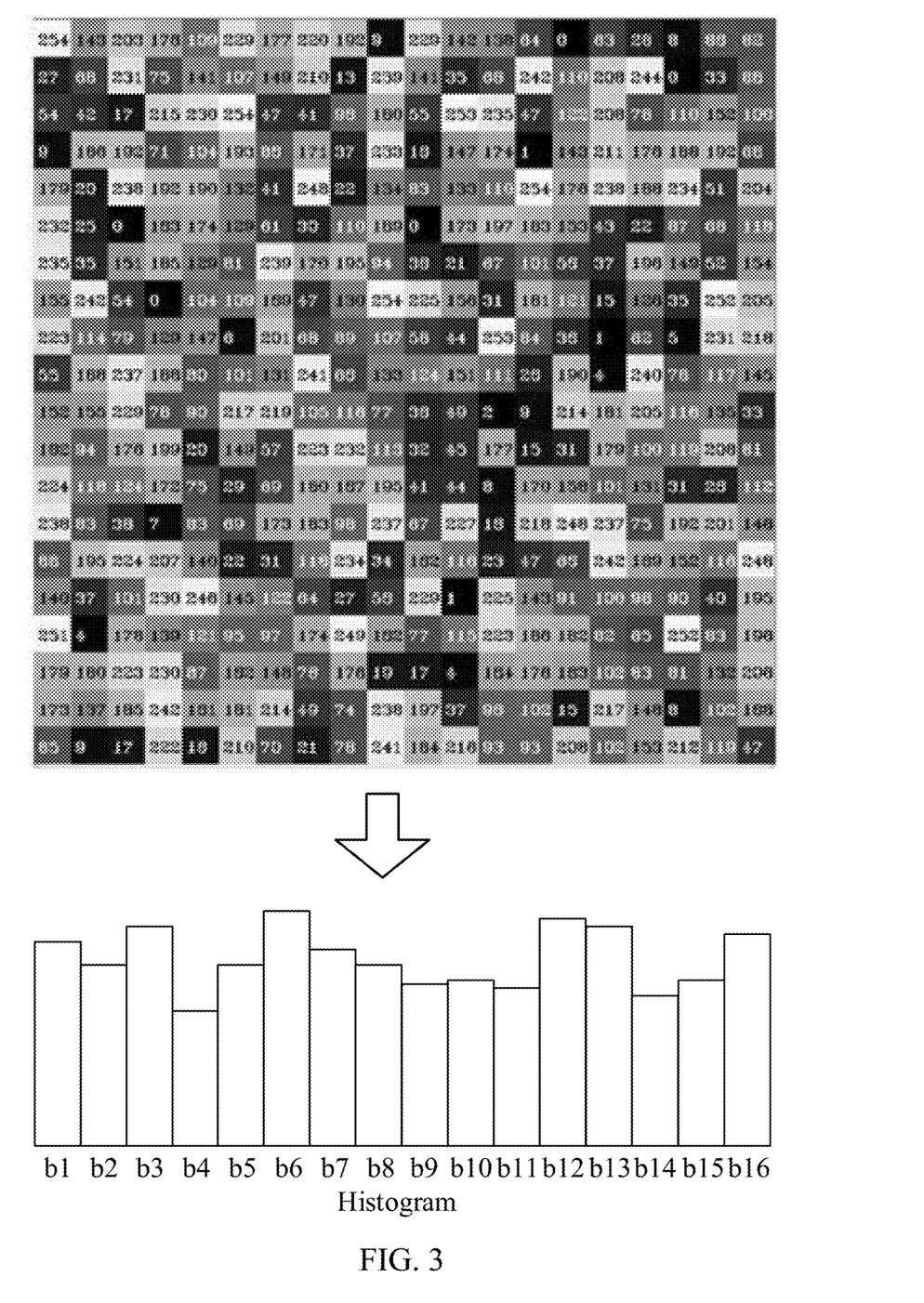
FIG. 3 shows grayscale values corresponding to an image and a histogram obtained by counting the grayscale values according to an embodiment of this application.

During specific implementation, the color feature interval may be preset by a person skilled in the art according to a specific application scenario and a range of a feature value corresponding to a color feature, and one color feature interval may correspond to one color feature value or a color feature value range. For example, a color feature is a grayscale of a pixel, and a grayscale value ranges from 0 to 255. Each grayscale value may be used as a color feature interval, that is, 256 grayscale intervals may be obtained in total. Alternatively, a grayscale value range of 0 to 255 may be divided into a plurality of regions, and each region is used as a color feature interval. For example, 0 to 15 is a color feature interval, and 16 to 31 is a color feature interval. By analogy, 16 color feature intervals $b1$ to $b16$ may be obtained in total. FIG. 3 shows a grayscale value of each pixel in an image. A quantity of pixels whose grayscale values fall within the 16 color feature intervals in the image is counted, to obtain a histogram corresponding to the grayscale values of the image.

S202. Obtain, according to a quantity of pixels whose color feature values fall within the color feature intervals in an upsampled image of the original image, a second histogram corresponding to the upsampled image.

In this embodiment of this application, an upsampled image is an image obtained by performing upsampling processing on the original image. A specific upsampling processing method is not limited in this application.

The color feature interval in the first histogram is the same as that in the second histogram.

S203. Respectively determine, according to the first histogram and the second histogram, target color feature intervals matching the color feature intervals in the second histogram.

S204. Process, according to the target color feature intervals matching the color feature intervals in the second histogram, the color feature values of the pixels falling within the color feature intervals in the upsampled image, to obtain a target image.

In this embodiment of this application, the first histogram is a histogram representing a color feature distribution in the original image, and the second histogram is a histogram representing a color feature distribution in the upsampled image.

During specific implementation, a matching relationship between color feature intervals in the second histogram and color feature intervals in the first histogram may be determined according to the color feature distributions shown in the first histogram and the second histogram, the matching relationship showing a correspondence between the color feature intervals closest the color feature distributions in the first histogram and the second histogram, and target color feature intervals matching the color feature intervals in the second histogram are determined based on the matching relationship. Subsequently, color feature values of pixels in the upsampled image are adjusted one by one according to the target color feature intervals matching the color feature intervals in the second histogram, to obtain a target image corresponding to the upsampled image, so that a color feature distribution in the target image corresponding to the upsampled image is consistent with the color feature distribution in the original image as much as possible.

During specific implementation, if a color feature interval in the second histogram is the same as a target color feature interval matching the color feature interval, there is no need to adjust a color feature value of a pixel falling within the color feature interval in the upsampled image.

For an upsampled image of an original image, a plurality of color features may be adjusted simultaneously. In this case, a first histogram of each color feature of the plurality of color features in the original image and a second histogram of each color feature in the upsampled image are obtained, and then color feature values of the color features in the upsampled image are adjusted respectively based on the first histograms and the second histograms corresponding to the color features.

For example, if brightness's and grayscales of the upsampled image need to be adjusted, a first histogram VL1 corresponding to brightness's of the original image, a first histogram VG1 corresponding to grayscales of the original image, a second histogram VL2 corresponding to the brightness's of the upsampled image, and a second histogram VG2 corresponding to the grayscales of the upsampled image are obtained. Subsequently, target brightness intervals matching brightness intervals in the second histogram are respectively determined based on the first histogram VL1 and the second histogram VL2, and brightness values of pixels falling within the brightness intervals in the upsampled image P1 are adjusted according to the target brightness intervals matching the brightness intervals to brightness values corresponding to the target brightness intervals matching the brightness intervals, to obtain an image P2. Next, target grayscale intervals matching grayscale intervals in the second histogram are respectively determined based on the first histogram VG1 and the second histogram VG2, and grayscale values of pixels falling within the grayscale intervals in the image P2 are adjusted according to the target grayscale intervals matching the grayscale intervals to grayscale values corresponding to the target grayscale intervals matching the grayscale intervals, to obtain a target image P3.

For example, when an image is sampled through YUV color encoding, first histograms respectively corresponding to color features of Y, U, and V of an original image and second histograms respectively corresponding to color features of Y, U, and V of an upsampled image may be obtained. Target color feature intervals matching color feature intervals in the second histogram corresponding to the color feature Y are respectively determined based on the first histogram and the second histogram that correspond to the color feature Y, and values of the color feature Y of pixels falling within the color feature intervals in the second histogram corresponding to the color feature Y in the upsampled image P1 are processed according to the target color feature intervals matching the color feature intervals, to obtain an image P2. Subsequently, target color feature intervals matching color feature intervals in the second histogram corresponding to the color feature U are respectively determined based on the first histogram and the second histogram that correspond to the color feature U, and values of the color feature U of pixels falling within the color feature intervals in the second histogram corresponding to the color feature U in the image P2 are processed according to the target color feature intervals matching the color feature intervals, to obtain an image P3. Finally, target color feature intervals matching color feature intervals in the second histogram corresponding to the color feature V are respectively determined based on the first histogram and the second histogram that correspond to the color feature V, and values of the color feature V of pixels falling within the color feature intervals in the second histogram corresponding to the color feature V in the image P3 are processed according to the target color feature intervals matching the color feature intervals, to obtain a target image.

According to the image processing method provided in this embodiment of this application, aliasing, color edge noise, and the like in an upsampled image can be weakened obviously, quality and a display effect of the upsampled image are improved, image details are restored better, and the processing manner is simple and efficient. The method is particularly applicable to an application scenario with a high processing efficiency requirement, for example, video real-time transmission.

During specific implementation, the matching relationship between the color feature intervals in the second histogram and the color feature intervals in the first histogram may be determined in a plurality of manners, so as to determine the target color feature intervals matching the color feature intervals in the second histogram.

In a possible implementation, the target color feature intervals matching the color feature intervals in the second histogram may be determined according to respectively calculated ratios corresponding to the color feature intervals in the first histogram and the second histogram. A ratio corresponding to each color feature interval in the first histogram is a ratio of a quantity of pixels whose color feature values fall within a corresponding color feature interval in the original image to a total quantity of pixels included in the original image, and a ratio corresponding to each color feature interval in the second histogram is a ratio of a quantity of pixels whose color feature values fall within a corresponding color feature interval in the upsampled image to a total quantity of pixels included in the upsampled image.

Based on the foregoing, step S203 specifically includes: determining differences between ratios corresponding to the color feature intervals in the first histogram and a ratio corresponding to any color feature interval in the second histogram, and determining, from a color feature interval in the first histogram corresponding to a difference satisfying a specified condition, a target color feature interval matching the color feature interval.

During specific implementation, the specified condition may be a minimum value of all differences corresponding to any color feature interval in the second histogram. For example, each of the first histogram and the second histogram includes 16 color feature intervals b1 to b16. A color feature interval b1 in the second histogram is used as an example, a difference between a ratio corresponding to each color feature interval in the first histogram and a ratio of the color feature interval b1 in the second histogram is calculated, and 16 differences may be obtained in total. A minimum difference is selected from the 16 differences, and a color feature interval in the first histogram corresponding to the minimum difference is determined as a target color feature interval matching the color feature interval b1 in the second histogram. For example, the minimum difference is a difference between the ratio of the color feature interval b1 in the second histogram and a ratio of a color feature interval b3 in the first histogram, and the target color feature interval matching the color feature interval b1 in the second histogram is b3.

During specific implementation, all differences corresponding to any color feature interval in the second histogram may alternatively be arranged in ascending order. In this case, the specified condition may be top N differences, N being greater than or equal to 1 and less than a total quantity of color feature intervals. A specific value of N may be determined by a person skilled in the art according to an actual application scenario, which is not limited in this embodiment of this application. For example, each of the first histogram and the second histogram includes 16 color feature intervals b1 to b16, and N=3. A color feature interval b1 in the second histogram is used as an example, a difference between a ratio corresponding to each color feature interval in the first histogram and a ratio of the color feature interval b1 in the second histogram is calculated, and 16 differences may be obtained in total. The 16 differences are arranged in ascending order, and top three differences are selected. It is assumed that color feature intervals in the first histogram corresponding to the top three differences are b1, b3, and b10, one color feature interval is determined from b1, b3, and b10 as a target color feature interval matching the color feature interval b1 in the second histogram.

During specific implementation, the specified condition may alternatively be that a difference is less than a difference threshold, that is, a color feature interval in a first histogram corresponding to a difference less than the difference threshold is determined as a target color feature interval matching a color feature interval corresponding to the difference in a second histogram. A color feature interval b1 in the second histogram is used as an example. A difference between a ratio of the color feature interval b1 in the second histogram and a ratio of a color feature interval b4 in the first histogram is less than the difference threshold, and a difference between the ratio of the color feature interval b1 in the second histogram and a ratio of a color feature interval b2 in the first histogram is less than the difference threshold, so that one of the color feature interval b2 or b4 is determined as a target color feature interval matching the color feature interval b1 in the second histogram.

According to the image processing method provided in the implementation, target color feature intervals matching color feature intervals in a second histogram may be simply and effectively determined according to differences between ratios of color feature intervals in a first histogram and ratios of color feature intervals in the second histogram, so that aliasing, color edge noise, and the like in an upsampled image can be weakened obviously, and quality and a display effect of the upsampled image are improved, thereby better restoring image details.

Further, when only one difference satisfies the specified condition, a color feature interval in the first histogram corresponding to the difference satisfying the specified condition is determined as a target color feature interval matching any color feature interval in the second histogram. In a case that at least two differences satisfy the specified condition, a color feature interval in the first histogram corresponding to each difference of the at least two differences is determined; and a color feature interval with a minimum grade difference from the color feature interval is selected from at least two determined color feature intervals, and the color feature interval with the minimum grade difference is determined as the target color feature interval matching the color feature interval.

In this embodiment of this application, a smaller grade difference between two color feature intervals indicates that color feature values represented by the two color feature intervals are closer. A grayscale value is used as an example. A grayscale value range corresponding to a color feature interval b1 is 0 to 15, a grayscale value range corresponding to a color feature interval b2 is 16 to 31, and a grayscale value range corresponding to a color feature interval b16 is 240 to 255. Obviously, grayscale values of the color feature interval b1 are closer to grayscale values of the color feature interval b2. Because ratios of a plurality of color feature intervals in a same image may be the same, for one color feature interval in a second histogram, ratios of a plurality of color feature intervals in a first histogram may be the same as or similar to a ratio of the color feature interval in the second histogram, and similar color feature intervals are expected and adjusted target color feature intervals.

A color feature interval b1 in the second histogram is used as an example. A difference between a ratio of the color feature interval b1 in the second histogram and a ratio corresponding to each color feature interval in the first histogram is calculated, and 16 differences may be obtained in total, which are: $d_{1,1}, d_{1,2}, \ldots, d_{1,i}, \ldots,$ and $d_{1,16}$, $d_{1,i}$ representing a difference between the ratio of the color feature interval b1 in the second histogram and a ratio of a color feature interval bi in the first histogram. If $d_{1,2}$ and $d_{1,5}$ of the 16 differences satisfy the specified condition, color feature intervals in the first histogram matching the color feature interval b1 in the second histogram are respectively b2 and b5. In this case, a grade difference between the color feature interval b2 and the color feature interval b1 is less than a grade difference between the color feature interval b5 and the color feature interval b1, that is, a color feature value corresponding to the color feature interval b2 is closer to a color feature value corresponding to the color feature interval b1, so that a target color feature interval matching the color feature interval b1 in the second histogram is b2.

Further, based on the inventive idea matching the histogram, to improve matching accuracy, a mapping relationship between the color feature intervals in the first histogram and the color feature intervals in the second histogram may be determined based on distributions of color feature values obtained through counting in the first histogram and the second histogram and by using some algorithms, and the target color feature intervals matching the color feature intervals in the second histogram may be determined based on the mapping relationship.

For example, the mapping relationship between the color feature intervals in the first histogram and the color feature intervals in the second histogram may be determined through the following formula:

$$F(i) = \text{Index}\left(\text{MIN}\left(\bigcup_{j=1}^{n}(a \times |V1[i] - V2[j]|) + c\right)\right),$$

where MIN is a function for obtaining a minimum value, Index is a function for obtaining a color feature interval bj corresponding to the minimum value outputted by the function MIN, i represents an $i^{th}$ color feature interval bi in a second histogram V2, V2[i] represents a ratio of the $i^{th}$ color feature interval bi in the second histogram V2, V1[j] represents a ratio of $j^{th}$ color feature interval bj in a first histogram V1, $1 \leq j \leq n$, and n is a total quantity of color feature intervals. a=MSE/618, where a mean square error MSE=$\Sigma_{i=1}^{n}(V2[i]-V1[i])^2$. A parameter a may represent an overall offset of ratios of color feature intervals in the first histogram and the second histogram, a parameter c=|j−i| represents a grade difference between the color feature interval j in the first histogram and the color feature interval i in the second histogram, and a probability that a color feature interval close to the color feature interval i in the second histogram is hit may be improved by increasing the parameter c. F(i) is an index number corresponding to a target color feature interval matching the $i^{th}$ color feature interval bi in the second histogram V2, for example, F(i)=k, that is, the target color feature interval matching the $i^{th}$ color feature interval bi in the second histogram V2 is bk.

In an actual application, the mapping relationship F(i) is not limited to the listed formula, and the parameters a and c are also not limited to the listed manner. For example, the mapping relationship may be further:

$$F(i) = \text{Index}\left(\text{MIN}\left(\bigcup_{j=1}^{n}(a \times |V1[i] - V2[j]| - V2[j]) + c\right)\right),$$

Alternatively, the mapping relationship may be:

$$F(i) = \text{MAX}\left(\text{Index}\left(\text{MIN}\left(\bigcup_{j=1}^{n}(a \times |V1[i] - V2[j]| - V2[j]) + c\right)\right), 1\right)$$

where MAX is a function for obtaining a maximum value, to ensure $F(i) \geq 1$.

According to the image processing method provided in the implementation, based on differences between ratios of color feature intervals in a first histogram and ratios of color feature intervals in a second histogram, target color feature intervals matching the color feature intervals in the second histogram are determined with reference to grade differences between the color feature intervals, to further improve matching accuracy.

In another possible implementation, the target color feature intervals matching the color feature intervals in the second histogram may be calculated according to the first histogram of the original image and the second histogram of the upsampled image. A quantity of pixels whose color feature values fall within the color feature intervals in the original image is counted in the first histogram, and a quantity of pixels whose color feature values fall within the color feature intervals in the upsampled image is counted in the second histogram.

Figure 4:
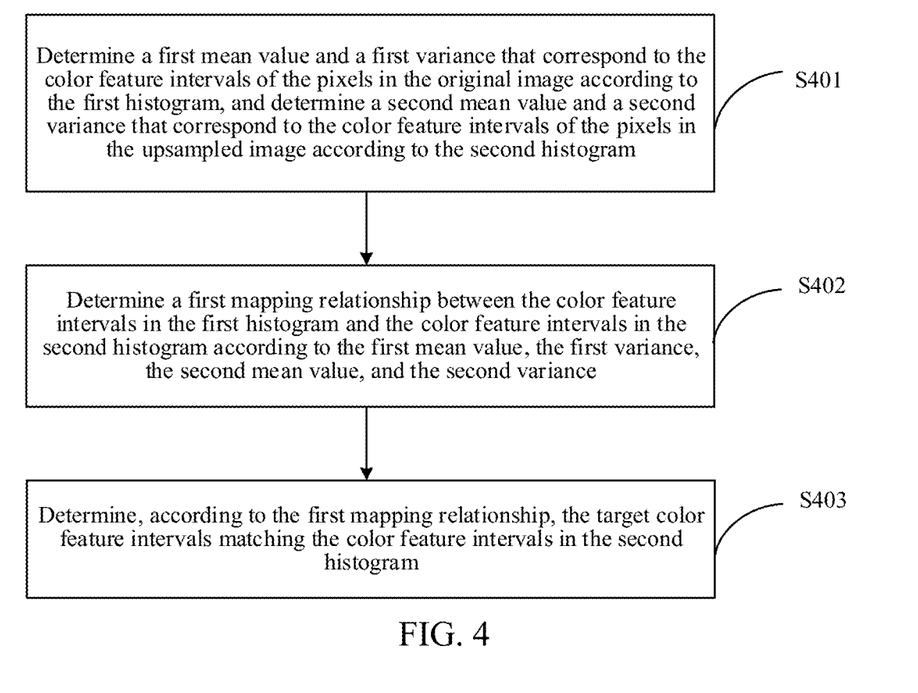
FIG. 4 is a schematic flowchart of determining target color feature intervals matching color feature intervals in a second histogram according to an embodiment of this application.

Based on the foregoing, referring to FIG. 4, step S203 may include the following steps.

S401. Determine a first mean value and a first variance that correspond to the color feature intervals of the pixels in the original image according to the first histogram, and determine a second mean value and a second variance that correspond to the color feature intervals of the pixels in the upsampled image according to the second histogram.

During specific implementation, a first mean value is $E1 = \sum_{i=1}^{n} i \times V1[i]$, a first variance is $$D1 = \frac{1}{n}\sum_{i=1}^{n}(V1[i] - E1)^2,$$

a second mean value is $E2 = \sum_{i=1}^{n} i \times V2[i]$, and a second variance is $$D2 = \frac{1}{n}\sum_{i=1}^{n}(V2[i] - E2)^2,$$

where n is the total quantity of color feature intervals, $V1[i]$ represents the ratio of the $i^{th}$ color feature interval bi in the first histogram V1, and $V2[i]$ represents the ratio of the $i^{th}$ color feature interval bi in the second histogram V2.

S402. Determine a first mapping relationship between the color feature intervals in the first histogram and the color feature intervals in the second histogram according to the first mean value, the first variance, the second mean value, and the second variance.

During specific implementation, the first mapping relationship may be:

$$F(i) = \text{round}(\alpha(i - E2) + E1)$$

where $\alpha = D2/D1$, round is a function for performing rounding off to obtain an integer, and V2(i) is a quantity of pixels whose color feature values fall within the color feature interval bi in the second histogram. F(i) is the index number corresponding to a target color feature interval matching the $i^{th}$ color feature interval bi in the second histogram V2. For example, F(1)=2, that is, a target color feature interval matching a color feature interval b1 in the second histogram V2 is b2.

During specific implementation, the first mapping relationship may alternatively be:

$$F(i) = \text{MID}(\text{round}(\alpha(i - E2) + E1), 1, n)$$

where $\alpha = D2/D1$, MID is a function for obtaining an intermediate value among three values of $\text{round}(\alpha(V2[i] - E2) + E1)$, 1, and n, to ensure $1 \leq F(i) \leq n$, and round is a function for performing rounding off to obtain an integer.

S403. Determine, according to the first mapping relationship, the target color feature intervals matching the color feature intervals in the second histogram.

During specific implementation, it is assumed that F(1) =2, a target color feature interval matching the color feature interval b1 in the second histogram V2 is b2, and if F(2)=4, a target color feature interval matching the color feature interval b2 in the second histogram V2 is b4. By analogy, a target color feature interval matching each color feature interval in the second histogram is obtained.

According to the image processing method provided in the implementation, a mapping relationship between color feature intervals in a first histogram and color feature intervals in a second histogram is directly calculated according to ratios of the color feature intervals in the first histogram and ratios of the color feature intervals in the second histogram, and target color feature intervals matching the color feature intervals in the second histogram are determined according to the mapping relationship, so that the processing manner is simple and efficient.

Based on any of the implementations, step S204 specifically includes: respectively adjusting, when each color feature interval corresponds to a color feature value, the color feature values of the pixels falling within the color feature intervals in the upsampled image as color feature values corresponding to the target color feature intervals matching the color feature intervals, to obtain the target image.

A description is made by using an example in which a color feature is a grayscale of a pixel. It is assumed that a grayscale value ranges from 0 to 255, each grayscale value is used as a color feature interval, that is, 256 grayscale intervals b1 to b256 may be obtained in total, and each grayscale interval corresponds to a grayscale value. It is assumed that a target grayscale interval matching a grayscale interval b1 in a second histogram is b2, a grayscale value 0 of a pixel falling within the grayscale interval b1 in an upsampled image is changed into a grayscale value 1 corresponding to the target grayscale interval b2. If a target grayscale interval matching a grayscale interval b2 in the second histogram is b2, there is no need to adjust a grayscale value of a pixel falling within the grayscale interval b2 in the upsampled image.

Based on any of the implementations, step S204 specifically includes: respectively determining, when each color feature interval corresponds to a color feature value range, a second mapping relationship between color feature value ranges corresponding to the color feature intervals in the second histogram and color feature value ranges corresponding to the target color feature intervals matching the color feature intervals, and adjusting the color feature values of the pixels falling within the color feature intervals in the upsampled image as color feature values determined according to the second mapping relationship.

A description is made by using an example in which a color feature is a grayscale of a pixel. It is assumed that a grayscale value ranges from 0 to 255, a grayscale value range of 0 to 255 is divided into 16 regions, and each region is used as a color feature interval. For example, 0 to 15 is a color feature interval, and 16 to 31 is a color feature interval. By analogy, 16 color feature intervals b1 to b16 may be obtained in total. A target grayscale interval matching a grayscale interval b1 in a second histogram is b2, a color feature value range of the grayscale interval b1 is 0 to 15, and a color feature value range of the target grayscale interval b2 is 16 to 31, so that a second mapping relationship between the color feature value range 0 to 15 and the color feature value range 16 to 31 is: 0→16, 1→17, ..., and 15→31. Therefore, a grayscale value 0 of a pixel in the grayscale interval b1 in the second histogram is adjusted to 16, a grayscale value 1 of a pixel in the grayscale interval b1 in the second histogram is adjusted to 17, and so on.

Figure 5:
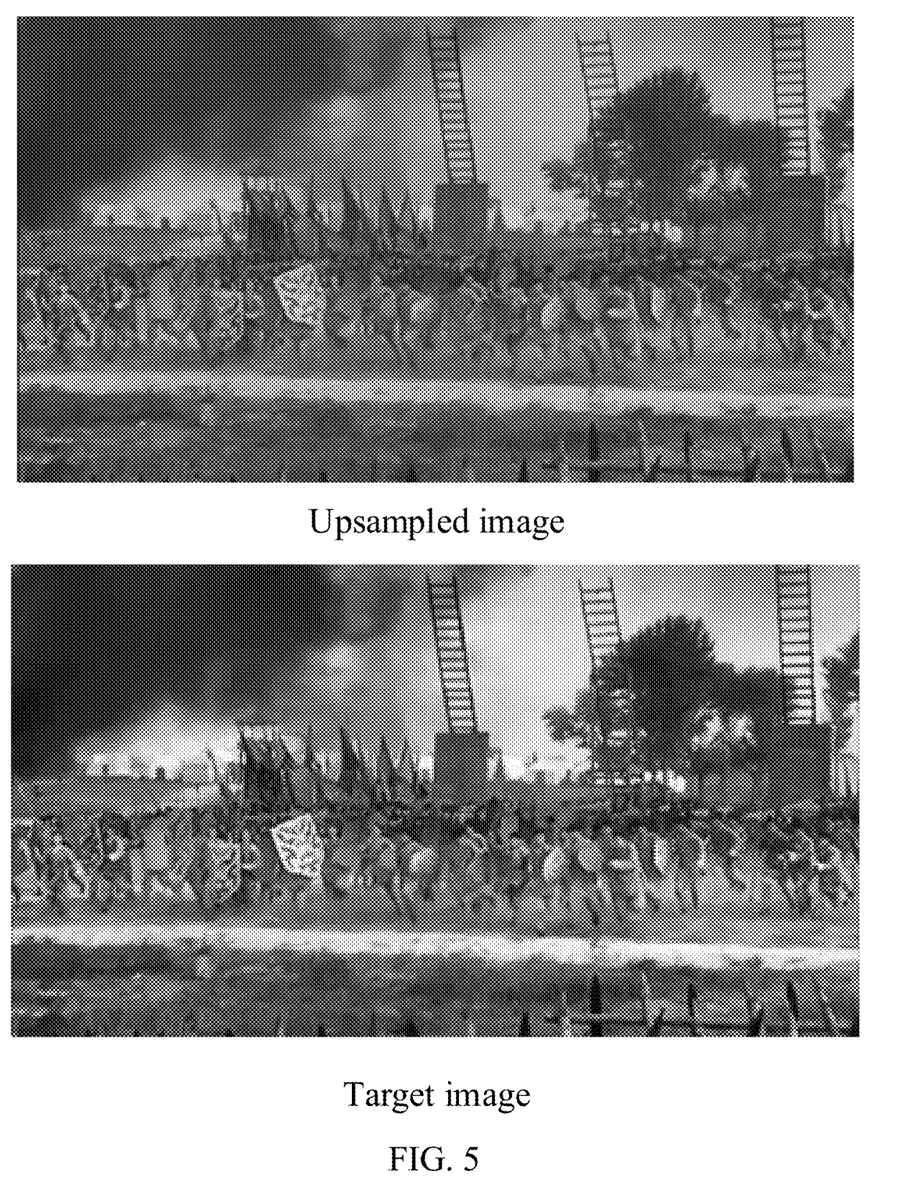
FIG. 5 is a corresponding diagram of an upsampled image and a target image according to an embodiment of this application.

FIG. 5 shows an upsampled image and a target image corresponding to the upsampled image obtained through an image processing method according to an embodiment of this application. It can be learned from the comparison between the two images before and after processing in FIG. 5 that compared with the upsampled image, no obvious aliasing and color edge noise occur in the target image obtained by using the image processing method provided in the embodiments of this application, and quality and a display effect of the target image are better than that of the original upsampled image, thereby better restoring image details.

Figure 6:
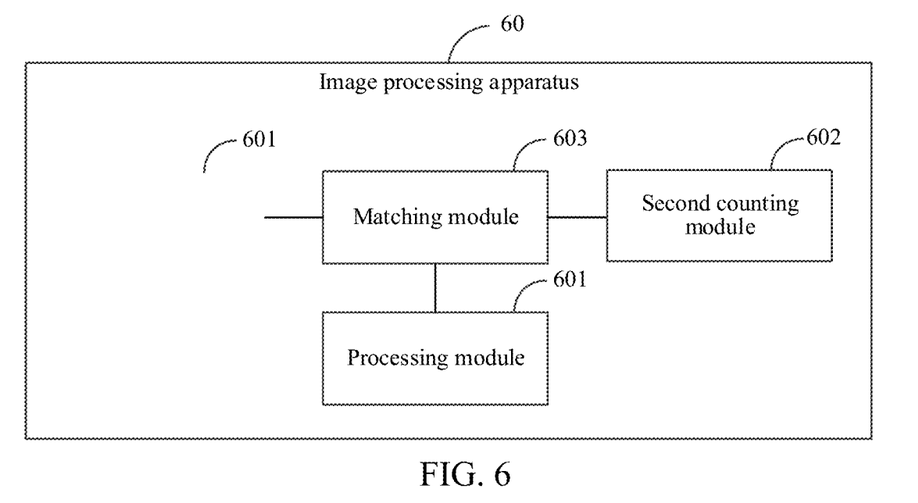
FIG. 6 is a schematic structural diagram of an image processing apparatus according to an embodiment of this application.

As shown in FIG. 6, based on the inventive idea the same as that of the foregoing image processing method, an embodiment of this application further provides an image processing apparatus 60, including a first counting module 601, a second counting module 602, a matching module 603, and a processing module 604.

The first counting module 601 is configured to obtain, according to a quantity of pixels whose color feature values fall within color feature intervals in an original image, a first histogram corresponding to the original image.

The second counting module 602 is configured to obtain, according to a quantity pixels whose color feature values fall within the color feature intervals in an upsampled image of the original image, a second histogram corresponding to the upsampled image.

The matching module 603 is configured to respectively determine, according to the first histogram and the second histogram, target color feature intervals matching the color feature intervals in the second histogram.

The processing module 604 is configured to process, according to the target color feature intervals matching the color feature intervals in the second histogram, the color feature values of the pixels falling within the color feature intervals in the upsampled image, to obtain a target image.

In some embodiments, the matching module 603 is further configured to determine differences between ratios corresponding to the color feature intervals in the first histogram and a ratio corresponding to any color feature interval in the second histogram, and determine, from a color feature interval in the first histogram corresponding to a difference satisfying a specified condition, a target color feature interval matching the color feature interval, a ratio corresponding to each color feature interval in the first histogram being a ratio of a quantity of pixels whose color feature values fall within a corresponding color feature interval in the original image to a total quantity of pixels included in the original image, and a ratio corresponding to each color feature interval in the second histogram being a ratio of a quantity of pixels whose color feature values fall within a corresponding color feature interval in the upsampled image to a total quantity of pixels included in the upsampled image.

In some embodiments, the matching module 603 is further configured to: determine, when at least two differences satisfy the specified condition, a color feature interval in the first histogram corresponding to each difference of the at least two differences; and select a color feature interval with a minimum grade difference from any color feature interval from at least two determined color feature intervals, and determine the color feature interval with the minimum grade difference as the target color feature interval matching the color feature interval.

In some embodiments, the matching module 603 is further configured to:
determine, according to the first histogram, a first mean value and a first variance that correspond to the color feature intervals of the pixels in the original image;
determine, according to the second histogram, a second mean value and a second variance that correspond to the color feature intervals of the pixels in the upsampled image;
determine a first mapping relationship between the color feature intervals in the first histogram and the color feature intervals in the second histogram according to the first mean value, the first variance, the second mean value, and the second variance; and
determine, according to the first mapping relationship, the target color feature intervals matching the color feature intervals in the second histogram.

In some embodiments, the processing module 604 is further configured to:
respectively adjust, when each color feature interval corresponds to a color feature value, the color feature values of the pixels falling within the color feature intervals in the upsampled image as color feature values corresponding to the target color feature intervals matching the color feature intervals, to obtain the target image; and
respectively determine, when each color feature interval corresponds to a color feature value range, a second mapping relationship between color feature value ranges corresponding to the color feature intervals in the second histogram and color feature value ranges corresponding to the target color feature intervals matching the color feature intervals, and adjust the color feature values of the pixels falling within the color feature intervals in the upsampled image as color feature values determined according to the second mapping relationship.

In some embodiments, the color feature value includes at least one of the following: a grayscale value of a pixel, a brightness value of the pixel, or a color value of the pixel.

The image processing apparatus provided in this embodiment of this application and the foregoing image processing method use the same inventive idea, and the same beneficial effects can be obtained. Details are not described herein again.

Figure 7:
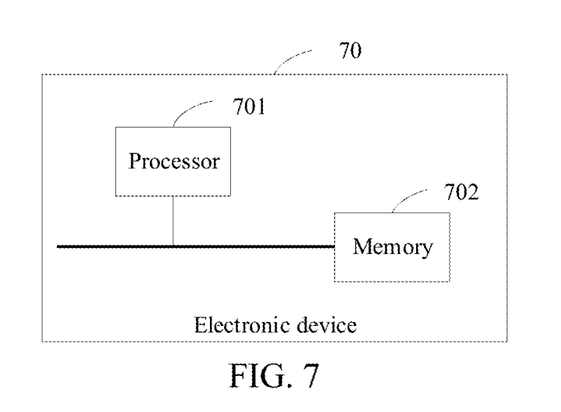
FIG. 7 is a schematic structural diagram of an electronic device according to an embodiment of this application.

Based on the inventive idea same as that of the image processing method, an embodiment of this application further provides an electronic device. the electronic device may be specifically the terminal device, the server, or the like in FIG. 1A and FIG. 1B. As shown in FIG. 7, the electronic device 70 may include a processor 701 and a memory 702. The memory 702 stores computer-executable instructions, the computer-executable instructions, when executed by the processor 701, causing processor 701 to perform steps of the foregoing image processing method. The steps in the image processing method may be steps in the image processing method in the foregoing embodiments.

The processor 701 may be a general purpose processor, such as a central processing unit (CPU), a digital signal processor (DSP), an application specific integrated circuit (ASIC), a field programmable gate array (FPGA), or another programmable logic device, a discrete gate or transistor logic device, or a discrete hardware component. The processor may implement or perform the methods, the steps, and logical block diagrams that are disclosed in the embodiments of this application. The general purpose processor may be a microprocessor or any conventional processor, or the like. Steps of the methods disclosed with reference to the embodiments of this application may be directly performed and completed by a hardware processor, or may be performed and completed by using a combination of hardware and a software module in the processor.

The memory 702, as a non-transitory computer-readable storage medium, may be configured to store a non-transitory software program, a non-transitory computer-executable program and a module. The memory may include at least one type of storage media, for example, may include: a flash memory, a hard disk, a multimedia card, a card type memory, a random access memory (RAM), a static random access memory (SRAM), a programmable read-only memory (PROM), a read-only memory (ROM), an electrically erasable programmable read-only memory (EEPROM), a magnetic memory, a magnetic disk, an optical disc, and the like. The memory is any other medium that can carry or store expected program code in a form of an instruction or a data structure and can be accessed by a computer, but is not limited thereto. The memory 702 according to this embodiment of this application may be further a circuit or any other apparatus that can implement a storage function, and is configured to store program instructions and/or data.

An embodiment of this application provides a computer-readable storage medium, configured to store computer-executable instructions used by the electronic device, the computer-executable instructions, when executed by a processor, causing the processor to perform the steps in the foregoing image processing method.

In an embodiment, a computer program product or a computer-readable instruction is provided, the computer program product or the computer-readable instruction includes computer-executable instructions, and the computer-executable instructions are stored in the computer-readable storage medium. The processor of the computer device reads the computer-executable instructions from the computer-readable storage medium, and the processor executes the computer-executable instructions, to cause the computer device to perform the steps in the method embodiments.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing computer-readable storage medium may be any computer-accessible usable medium or a data storage device, includes but not limited to: a magnetic memory (for example, a floppy disk, a hard disk, a magnetic tape, or a magneto-optical (MO) disk), an optical memory (for example, a CD, a DVD, a BD, or an HVD), and a semiconductor memory (for example, a ROM, an EPROM, an EEPROM, a non-volatile memory (NAND FLASH), or a solid-state disk (SSD)).

The foregoing embodiments are merely used for describing the technical solutions of this application. The descriptions of the foregoing embodiments are merely intended to help understand the methods of the embodiments of this application, and are not to be construed as a limitation on the embodiments of this application. Any variation or replacement readily figured out by a person skilled in the art is to fall within the protection scope of the embodiments of this application.

What is claimed is:

1. An image processing method performed by an electronic device, the method comprising:

obtaining, according to a quantity of pixels whose color feature values fall within color feature intervals in an original image, a first histogram corresponding to the original image;

obtaining, according to a quantity of pixels whose color feature values fall within the color feature intervals in an upsampled image of the original image, a second histogram corresponding to the upsampled image;

respectively determining, according to the first histogram and the second histogram, target color feature intervals matching the color feature intervals in the second histogram, wherein each target color feature interval is a color feature interval in the first histogram with a color feature distribution closest to a corresponding one of the color feature intervals in the second histogram; and processing, according to the target color feature intervals matching the color feature intervals in the second histogram, the color feature values of the pixels falling within the corresponding color feature intervals in the upsampled image, to obtain a target image, wherein a color feature distribution in the target image corresponding to the upsampled image is consistent with the color feature distribution in the original image.

2. The method according to claim 1, wherein the respectively determining, according to the first histogram and the second histogram, target color feature intervals matching the color feature intervals in the second histogram further comprises:

determining differences between ratios corresponding to the color feature intervals in the first histogram and a ratio corresponding to any color feature interval in the second histogram, wherein a ratio corresponding to each color feature interval in the first histogram is a ratio of a quantity of pixels whose color feature values fall within a corresponding color feature interval in the original image to a total quantity of pixels comprised in the original image, and a ratio corresponding to each color feature interval in the second histogram is a ratio of a quantity of pixels whose color feature values fall within a corresponding color feature interval in the upsampled image to a total quantity of pixels comprised in the upsampled image; and determining, from a color feature interval in the first histogram corresponding to a difference satisfying a specified condition, a target color feature interval matching the color feature interval.

3. The method according to claim 2, wherein when at least two differences satisfy the specified condition, the determining, from a color feature interval in the first histogram corresponding to a difference satisfying a specified condition, a target color feature interval matching the color feature interval further comprises:

determining a color feature interval in the first histogram corresponding to each difference of the at least two differences;

selecting, from at least two determined color feature intervals, a color feature interval with a minimum grade difference from the color feature interval; and determining the color feature interval with the minimum grade difference as the target color feature interval matching the color feature interval.

4. The method according to claim 2, wherein when only one difference satisfies the specified condition, the determining, from a color feature interval in the first histogram corresponding to a difference satisfying a specified condition, a target color feature interval matching the color feature interval further comprises:

determining the color feature interval in the first histogram corresponding to the difference satisfying the specified condition as the target color feature interval matching the color feature interval.

5. The method according to claim 1, wherein the respectively determining, according to the first histogram and the second histogram, target color feature intervals matching the color feature intervals in the second histogram further comprises:

determining, according to the first histogram, a first mean value and a first variance that correspond to the color feature intervals of the pixels in the original image;

determining, according to the second histogram, a second mean value and a second variance that correspond to the color feature intervals of the pixels in the upsampled image;

determining a first mapping relationship between the color feature intervals in the first histogram and the color feature intervals in the second histogram according to the first mean value, the first variance, the second mean value, and the second variance; and determining, according to the first mapping relationship, the target color feature intervals matching the color feature intervals in the second histogram.

6. The method according to claim 1, wherein the processing, according to the target color feature intervals matching the color feature intervals in the second histogram, the color feature values of the pixels falling within the color feature intervals in the upsampled image, to obtain a target image comprises:

respectively adjusting, when each color feature interval corresponds to a color feature value, the color feature values of the pixels falling within the color feature intervals in the upsampled image as color feature values corresponding to the target color feature intervals matching the color feature intervals, to obtain the target image; and respectively determining, when each color feature interval corresponds to a color feature value range, a second mapping relationship between color feature value ranges corresponding to the color feature intervals in the second histogram and color feature value ranges corresponding to the target color feature intervals matching the color feature intervals, and adjusting the color feature values of the pixels falling within the color feature intervals in the upsampled image as color feature values determined according to the second mapping relationship.

7. The method according to claim 1, wherein the color feature value comprises at least one of the following: a grayscale value of a pixel, a brightness value of the pixel, or a color value of the pixel.

8. An electronic device, comprising a memory and one or more processors, the memory storing computer-executable instructions, the computer-executable instructions, when executed by the processors, causing the electronic device to perform an image processing method including:

obtaining, according to a quantity of pixels whose color feature values fall within color feature intervals in an original image, a first histogram corresponding to the original image;

obtaining, according to a quantity of pixels whose color feature values fall within the color feature intervals in an upsampled image of the original image, a second histogram corresponding to the upsampled image;

respectively determining, according to the first histogram and the second histogram, target color feature intervals matching the color feature intervals in the second histogram, wherein each target color feature interval is a color feature interval in the first histogram with a color feature distribution closest to a corresponding one of the color feature intervals in the second histogram; and processing, according to the target color feature intervals matching the color feature intervals in the second histogram, the color feature values of the pixels falling within the corresponding color feature intervals in the upsampled image, to obtain a target image, wherein a color feature distribution in the target image corresponding to the upsampled image is consistent with the color feature distribution in the original image.

9. The electronic device according to claim 8, wherein the respectively determining, according to the first histogram and the second histogram, target color feature intervals matching the color feature intervals in the second histogram further comprises:

determining differences between ratios corresponding to the color feature intervals in the first histogram and a ratio corresponding to any color feature interval in the second histogram, wherein a ratio corresponding to each color feature interval in the first histogram is a ratio of a quantity of pixels whose color feature values fall within a corresponding color feature interval in the original image to a total quantity of pixels comprised in the original image, and a ratio corresponding to each color feature interval in the second histogram is a ratio of a quantity of pixels whose color feature values fall within a corresponding color feature interval in the upsampled image to a total quantity of pixels comprised in the upsampled image; and determining, from a color feature interval in the first histogram corresponding to a difference satisfying a specified condition, a target color feature interval matching the any color feature interval.

10. The electronic device according to claim 9, wherein the determining, from a color feature interval in the first histogram corresponding to a difference satisfying a specified condition, a target color feature interval matching the color feature interval further comprises:

determining, when at least two differences satisfy the specified condition, a color feature interval in the first histogram corresponding to each difference of the at least two differences;

selecting, from at least two determined color feature intervals, a color feature interval with a minimum grade difference from the color feature interval; and determining the color feature interval with the minimum grade difference as the target color feature interval matching the color feature interval.

11. The electronic device according to claim 9, wherein the determining, from a color feature interval in the first histogram corresponding to a difference satisfying a specified condition, a target color feature interval matching the color feature interval further comprises:

determining, when only one difference satisfies the specified condition, the color feature interval in the first histogram corresponding to the difference satisfying the specified condition as the target color feature interval matching the color feature interval.

12. The electronic device according to claim 8, wherein the respectively determining, according to the first histogram and the second histogram, target color feature intervals matching the color feature intervals in the second histogram further comprises:

determining, according to the first histogram, a first mean value and a first variance that correspond to the color feature intervals of the pixels in the original image;

determining, according to the second histogram, a second mean value and a second variance that correspond to the color feature intervals of the pixels in the upsampled image;

determining a first mapping relationship between the color feature intervals in the first histogram and the color feature intervals in the second histogram according to the first mean value, the first variance, the second mean value, and the second variance; and determining, according to the first mapping relationship, the target color feature intervals matching the color feature intervals in the second histogram.

13. The electronic device according to claim 8, wherein the processing, according to the target color feature intervals matching the color feature intervals in the second histogram, the color feature values of the pixels falling within the color feature intervals in the upsampled image, to obtain a target image comprises:

respectively adjusting, when each color feature interval corresponds to a color feature value, the color feature values of the pixels falling within the color feature intervals in the upsampled image as color feature values corresponding to the target color feature intervals matching the color feature intervals, to obtain the target image; and respectively determining, when each color feature interval corresponds to a color feature value range, a second mapping relationship between color feature value ranges corresponding to the color feature intervals in the second histogram and color feature value ranges corresponding to the target color feature intervals matching the color feature intervals, and adjusting the color feature values of the pixels falling within the color feature intervals in the upsampled image as color feature values determined according to the second mapping relationship.

14. The electronic device according to claim 8, wherein the color feature value comprises at least one of the following: a grayscale value of a pixel, a brightness value of the pixel, or a color value of the pixel.

15. A non-transitory computer-readable storage medium storing computer-executable instructions, the computer-executable instructions, when executed by a processor of an electronic device, causing the electronic device to perform an image processing method including:

obtaining, according to a quantity of pixels whose color feature values fall within color feature intervals in an original image, a first histogram corresponding to the original image;

obtaining, according to a quantity of pixels whose color feature values fall within the color feature intervals in an upsampled image of the original image, a second histogram corresponding to the upsampled image;

respectively determining, according to the first histogram and the second histogram, target color feature intervals matching the color feature intervals in the second histogram, wherein each target color feature interval is a color feature interval in the first histogram with a color feature distribution closest to a corresponding one of the color feature intervals in the second histogram; and processing, according to the target color feature intervals matching the color feature intervals in the second histogram, the color feature values of the pixels falling within the corresponding color feature intervals in the upsampled image, to obtain a target image, wherein a color feature distribution in the target image corresponding to the upsampled image is consistent with the color feature distribution in the original image.

16. The non-transitory computer-readable storage medium according to claim 15, wherein the respectively determining, according to the first histogram and the second histogram, target color feature intervals matching the color feature intervals in the second histogram further comprises:

determining differences between ratios corresponding to the color feature intervals in the first histogram and a ratio corresponding to any color feature interval in the second histogram, wherein a ratio corresponding to each color feature interval in the first histogram is a ratio of a quantity of pixels whose color feature values fall within a corresponding color feature interval in the original image to a total quantity of pixels comprised in the original image, and a ratio corresponding to each color feature interval in the second histogram is a ratio of a quantity of pixels whose color feature values fall within a corresponding color feature interval in the upsampled image to a total quantity of pixels comprised in the upsampled image; and determining, from a color feature interval in the first histogram corresponding to a difference satisfying a specified condition, a target color feature interval matching the any color feature interval.

17. The non-transitory computer-readable storage medium according to claim 16, wherein the determining, from a color feature interval in the first histogram corresponding to a difference satisfying a specified condition, a target color feature interval matching the color feature interval further comprises:
  determining, when at least two differences satisfy the specified condition, a color feature interval in the first histogram corresponding to each difference of the at least two differences;
  selecting, from at least two determined color feature intervals, a color feature interval with a minimum grade difference from the color feature interval; and
  determining the color feature interval with the minimum grade difference as the target color feature interval matching the color feature interval.

18. The non-transitory computer-readable storage medium according to claim 16, wherein the determining, from a color feature interval in the first histogram corresponding to a difference satisfying a specified condition, a target color feature interval matching the color feature interval further comprises:
  determining, when only one difference satisfies the specified condition, the color feature interval in the first histogram corresponding to the difference satisfying the specified condition as the target color feature interval matching the color feature interval.

19. The non-transitory computer-readable storage medium according to claim 15, wherein the respectively determining, according to the first histogram and the second histogram, target color feature intervals matching the color feature intervals in the second histogram further comprises:
  determining, according to the first histogram, a first mean value and a first variance that correspond to the color feature intervals of the pixels in the original image;
  determining, according to the second histogram, a second mean value and a second variance that correspond to the color feature intervals of the pixels in the upsampled image;
  determining a first mapping relationship between the color feature intervals in the first histogram and the color feature intervals in the second histogram according to the first mean value, the first variance, the second mean value, and the second variance; and
  determining, according to the first mapping relationship, the target color feature intervals matching the color feature intervals in the second histogram.

20. The non-transitory computer-readable storage medium according to claim 15, wherein the processing, according to the target color feature intervals matching the color feature intervals in the second histogram, the color feature values of the pixels falling within the color feature intervals in the upsampled image, to obtain a target image comprises:
  respectively adjusting, when each color feature interval corresponds to a color feature value, the color feature values of the pixels falling within the color feature intervals in the upsampled image as color feature values corresponding to the target color feature intervals matching the color feature intervals, to obtain the target image; and
  respectively determining, when each color feature interval corresponds to a color feature value range, a second mapping relationship between color feature value ranges corresponding to the color feature intervals in the second histogram and color feature value ranges corresponding to the target color feature intervals matching the color feature intervals, and adjusting the color feature values of the pixels falling within the color feature intervals in the upsampled image as color feature values determined according to the second mapping relationship.

\* \* \* \* \*